US009006615B2

(12) United States Patent
Zhan

(10) Patent No.: US 9,006,615 B2
(45) Date of Patent: Apr. 14, 2015

(54) TEMPERATURE AUTO-COMPENSATION GRILL

(71) Applicant: Yixin Zhan, Zhangzhou (CN)

(72) Inventor: Yixin Zhan, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 0 days.

(21) Appl. No.: 14/093,653

(22) Filed: Dec. 2, 2013

(65) Prior Publication Data

US 2014/0076175 A1 Mar. 20, 2014

Related U.S. Application Data

(62) Division of application No. 13/384,399, filed as application No. PCT/CN2010/075074 on Jul. 9, 2010.

(30) Foreign Application Priority Data

Jul. 10, 2009 (CN) .......................... 2009 2 0306005

(51) Int. Cl.
H05B 3/68 (2006.01)
A47J 37/06 (2006.01)
(52) U.S. Cl.
CPC .................................. A47J 37/0611 (2013.01)
(58) Field of Classification Search
CPC ..................................................... A47J 37/0709
USPC .................... 99/331, 372, 377, 423; 219/448
See application file for complete search history.

(56) References Cited

U.S. PATENT DOCUMENTS

| 3,281,577 | A | * | 10/1966 | Altemiller | 219/524 |
| 3,669,006 | A | * | 6/1972 | Lee, Sr. | 99/450.3 |
| 3,776,124 | A | * | 12/1973 | Morley | 99/335 |
| 7,285,751 | B2 | * | 10/2007 | Li | 219/386 |
| 2007/0017384 | A1 | * | 1/2007 | Serra | 99/372 |

FOREIGN PATENT DOCUMENTS

| CN | 2820025 Y | 6/2005 |
| CN | 1882274 A | 12/2006 |
| CN | 201469052 U | 5/2010 |
| JP | 2001221445 A | 8/2001 |

* cited by examiner

Primary Examiner — Tu B Hoang
Assistant Examiner — Alba Rosario-Aponte
(74) Attorney, Agent, or Firm — Rabin & Berdo, P.C.

(57) ABSTRACT

A temperature auto-compensation grill includes rotatingly connected upper and lower grilling units; a heating circuit including a heater and a thermostat having a change-over switch; and an operating mechanism including a linkage that is slidingly connected to the lower grilling unit, a first end of the linkage making contact with the change-over switch and a second end of the linkage extending from the lower grilling unit and making contact with the withstand portion of the upper grilling unit in an open position. The upper grilling unit has a withstand portion withstands that contacts the second end of the linkage and slidingly pushes the linkage when the upper grilling unit rotates from a closed position to an open position. The thermostat has a first steady temperature in the closed position, and a second steady temperature in the open position, and the first steady temperature is lower than the second steady temperature.

2 Claims, 6 Drawing Sheets

TEMPERATURE AUTO-COMPENSATION GRILL

CROSS-REFERENCE TO RELATED APPLICATIONS

This application is a divisional of co-pending application Ser. No. 13/384,399, filed Jan. 17, 2012, and the right of priority of the parent application is and was claimed under 35 USC §119 of Chinese Application No. 200920306005.1, filed Jul. 10, 2009, and PCT Application No. CN2010/75074, filed Jul. 9, 2010, the entire disclosure of which is incorporated herein by reference.

BACKGROUND OF THE INVENTION

1. Field of the Invention

The present invention relates to a temperature auto-compensation grill.

2. Background of the Related Art

An existing grill includes an upper grilling unit, a lower grilling unit and a heating circuit, the upper grilling unit having rotating joints to the lower grilling unit that can rotate between a first position and a second position. The grill is in a first status when the upper grilling unit is situated in the first position; the grill is in a second status when the upper grilling unit is situated in the second position. The heating circuit includes a heater and a thermostat; one end of the heater connects to one electrode of the power source, the other end connects to one end of the thermostat, and the other end of the thermostat connects to the other electrode of the power source. The invariable temperature of the thermostat cannot be adjusted, so that the grill temperature in the first status is equal to that in the second status. But with the difference of the working status in the first and the second status, for example, the first status is the grill closed status and the second status is the grill open status, the temperature obviously will be different in the grill.

SUMMARY OF THE INVENTION

The present invention is provided with a temperature auto-compensation grill, which overcomes the disadvantage of existing grills having a bigger difference in temperature of the grill.

The first technical proposal of the present invention to resolve the problem of the existing technology is:

A temperature auto-compensation grill includes an upper grilling unit, a lower grilling unit and a heating circuit; the upper grilling unit rotatingly connects to the lower grilling unit and rotates between a first position and a second position. The grill is in the first status when the upper grilling unit is situated in the first position; the grill is in the second status when the upper grilling unit is situated in the second position. The heating circuit includes:

A heater, one end of which attaches to one electrode of the power source;

A first thermostat, one end of which attaches to the other end of the heater;

A second thermostat, one end of which attaches to the other end of the heater; and A change-over switch, which connects to the other electrode of the power source and the first thermostat in the first status, the change-over switch connects to the other electrode of the power source and the second thermostat.

In another preferred embodiment, the present invention further includes an operating mechanism to touch the change-over switch; the operating mechanism links to the upper grilling unit of the grill to form a linkage connection.

In another preferred embodiment, the change-over switch is a push electric switch, which has a push switch; the operating mechanism includes a rotation pan which rotates synchronously with the upper grilling unit and a pendulum which is fixed in the rotation pan, the pendulum can touch the push switch.

In another preferred embodiment, the steady temperature of the first thermostat is lower than that of the second thermostat.

In another preferred embodiment, the heating circuit and the switch are disposed under the lower grilling unit.

The second technical proposal of the present invention to resolve the problem of the existing technology is:

A temperature auto-compensation grill includes an upper grilling unit, a lower grilling unit and a heating circuit, the upper grilling unit rotatingly connects to the lower grilling unit and rotates between a first position and a second position; The grill is in the first status when the upper grilling unit is situated in the first position; the grill is in the second status when the upper grilling unit is situated in the second position. The heating circuit includes:

A heater, one end of which attaches to one electrode of the power;

A thermostat for the steady temperature regulation connecting to the other end of the heater and the other electrode of the power, the thermostat includes a change-over switch to set the first steady temperature in the first status and the second steady temperature in the second status.

In another preferred embodiment, the grill includes an operation mechanism linking to the change-over switch, the operation mechanism links to the upper grilling unit to form a linkage connection.

In another preferred embodiment, the operation mechanism includes a linkage slidingly connected to the upper grilling unit, the first end of the linkage touches the change-over switch; the upper grilling unit is disposed with a withstand portion which can withstand the second end of the linkage to push the linkage slidingly when the upper grilling unit rotates from the first position to the second position.

In another preferred embodiment, the first steady temperature is lower than the second steady temperature.

Compared to the existing technical proposal, the present invention of a temperature auto-compensation grill can choose different thermostats or choose different temperature of the thermostat when in the first status or in the second status. The present invention regulates the temperature control system automatically and achieves the effect of temperature auto-compensation. So the pan temperature of the grill keeps steady, reducing the pan temperature difference due to the different heat emission conditions in different working statuses. The operation mechanism linkage connects to the upper grilling unit, so when the upper grilling unit is situated in the second position, that is the grill in the second status, the grill will operate the change-over switch or change-over mechanism automatically. When the upper grilling unit returns to the first position, that is the grill in the first status, the grill will return the change-over switch or the change-over mechanism. So the choice of the thermostat and the change of the change-over switch is intellectually chosen.

The rotation pan drives the pendulum to swing and the pendulum pushes the change-over switch to realize the automatic choice of thermostat. The present invention has a simple structure and is cheap, having high change-over accuracy. The withstand portion withstands the linkage to push the linkage slidingly, and the sliding linkage drives the change-over switch rotating, making the thermostat changing over with a steady temperature changing. The present invention has a simple structure and is cheap, having high change-over accuracy.

BRIEF DESCRIPTION OF THE DRAWINGS

The present invention will be further described with the drawings and the embodiments.

DETAILED DESCRIPTION OF THE INVENTION

The First Preferred Embodiment

Figure 1:
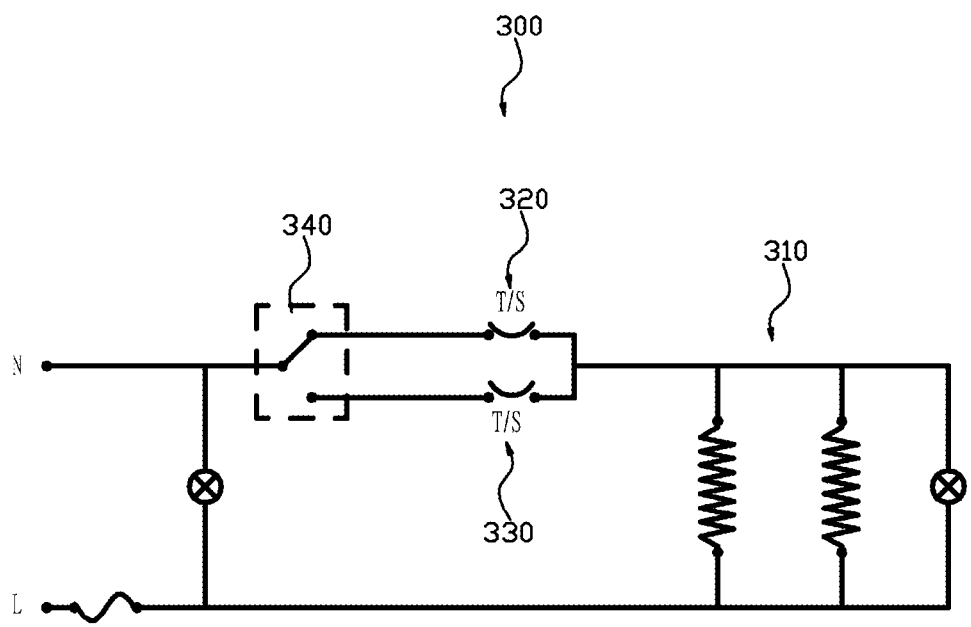
FIG. 1 illustrates the circuit of the grill in the first embodiment.
Figure 2:
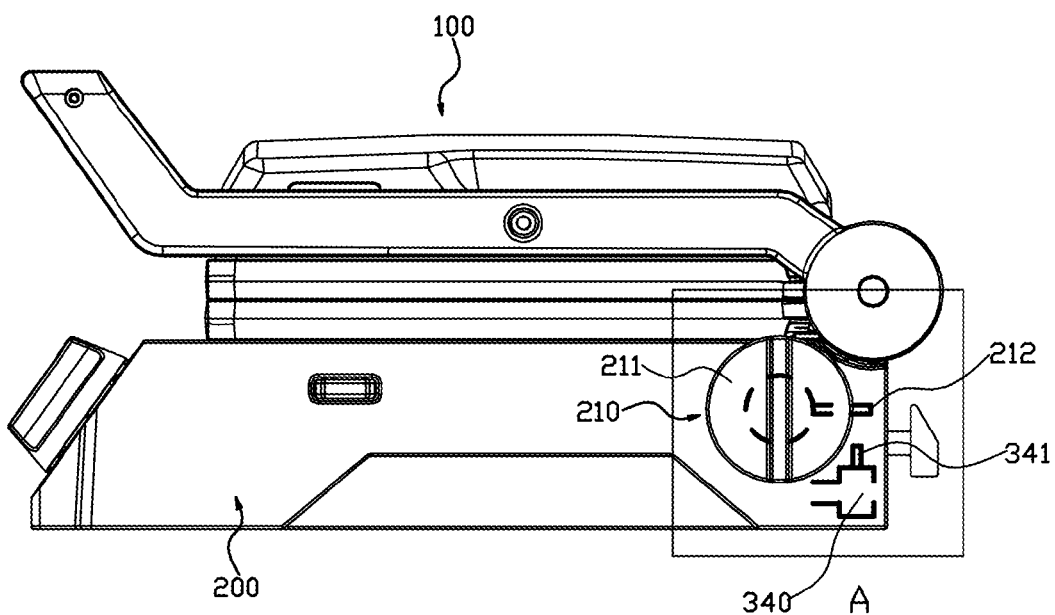
FIG. 2 illustrates the stereoscopic diagram of the grill in closed status in the first embodiment.
Figure 3:
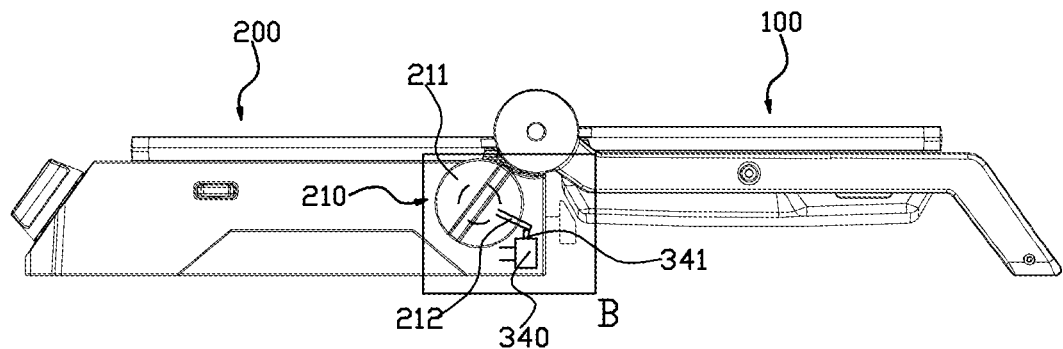
FIG. 3 illustrates the stereoscopic diagram of the grill in open status.

Referring to FIG. 1, FIG. 2 and FIG. 3, a temperature auto-compensation grill includes an upper grilling unit 100, a lower grilling unit 200 and a heating circuit 300 (shown in FIG. 1). The upper grilling unit 100 rotatingly connects to the lower grilling unit 200 and rotates between a first position and a second position. The grill is in a closed status when the upper grilling unit 100 is in the first position shown in FIG. 2, and the grill is in an open status when the upper grilling unit is in the second position shown in FIG. 3.

Referring to FIG. 2, FIG. 3, FIG. 4 and FIG. 5, the upper grilling unit 100 is disposed with an operation mechanism 210, which includes a rotation pan 211 to synchronously rotate with the upper grilling unit 100 and an operation pendulum 212 fixed to the rotation pan 211 and extended out of the rotation pan 211. In this embodiment, synchronously rotating between the upper grilling unit 100 and the rotation pan 211 means that the rotation of the upper grilling unit 100 drives the rotation pan 211 to rotate. The detailed structure can be like this: the upper grilling unit 100 includes a rotating sleeve (not shown) rotating on the axis, the rotating sleeve and the rotating pan gear with another. So the rotating sleeve is the driving gear and the rotation pan is the driven gear.

Figure 4:
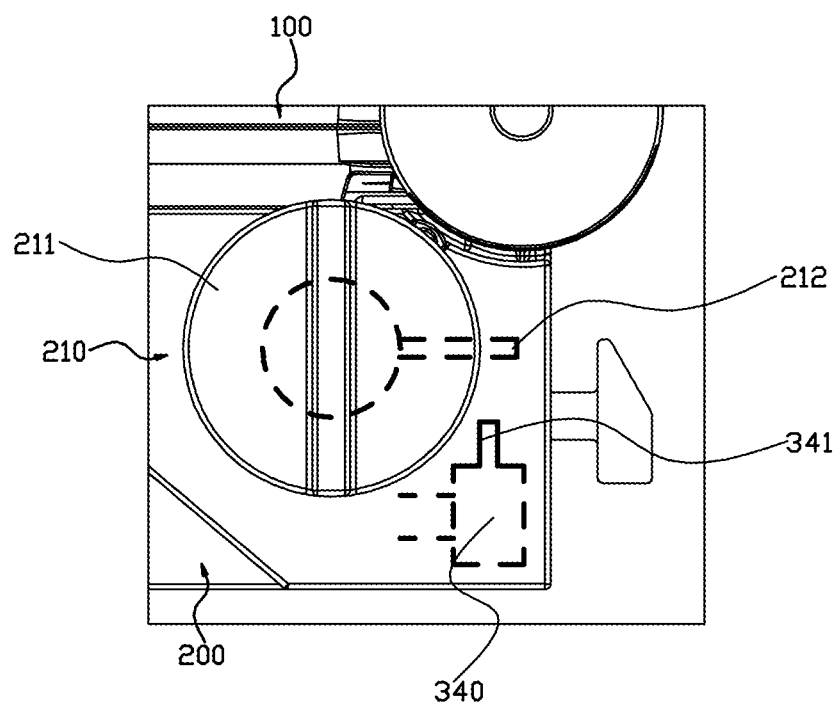
FIG. 4 illustrates the A enlargement schematic.
Figure 5:
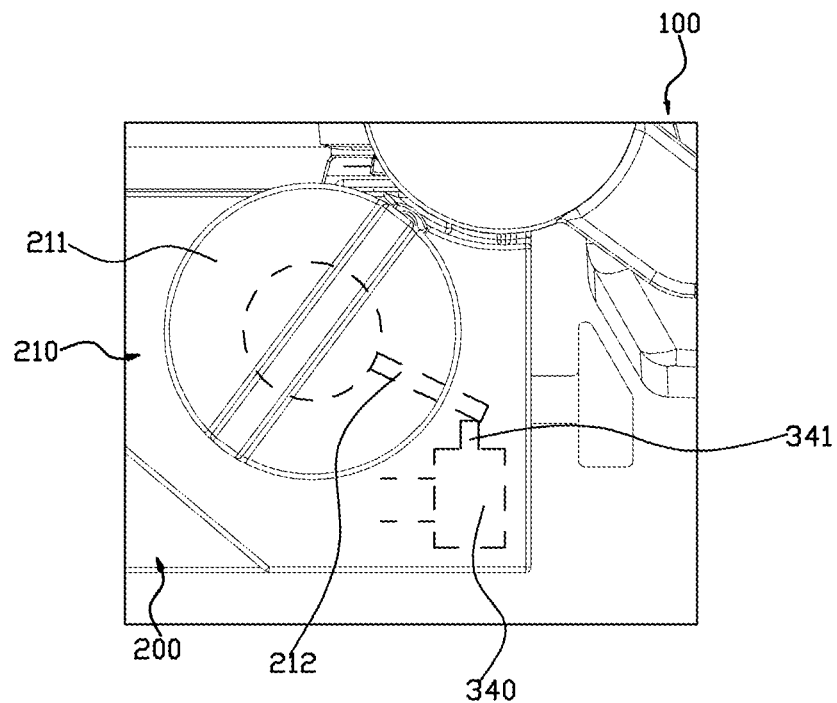
FIG. 5 illustrates the enlargement of part B of FIG. 3.

Referring to the FIG. 1, FIG. 4 and the FIG. 5, the heating circuit 300 includes:

A heater 310, one end of which attaches to one electrode of the power source;

A first thermostat 320, one end of which attaches to the other end of the heater;

A second thermostat 330, one end of which attaches to the other end of the heater; and A change-over switch 340, which connects to the other electrode of the power source and the first thermostat in the first status, the change-over switch connects to the other electrode of the power source and the second thermostat in the second status.

In this embedment, the change-over switch 340 is a push electrical switch, including a push switch 341.

The grill changes from the closed status to the open in 180 degrees status, the upper grilling unit rotates to drive the rotation pan rotating and the pendulum swing. The pendulum will push the push switch 341 to cut off the first thermostat and connect the second thermostat when the pendulum swings to a certain position. The grill changes from the opening in 180 degrees status to the closed status, the pendulum and the push switch 341 return to the normal position to cut off the second thermostat and connect the first thermostat.

In this preferred embodiment, as a requirement, the heating circuit 300 can further include a power light and a heater light connected in parallel to the heater, and the steady temperature of the first thermostat is lower than the steady temperature of the second thermostat.

The Second Preferred Embodiment

Figure 6:
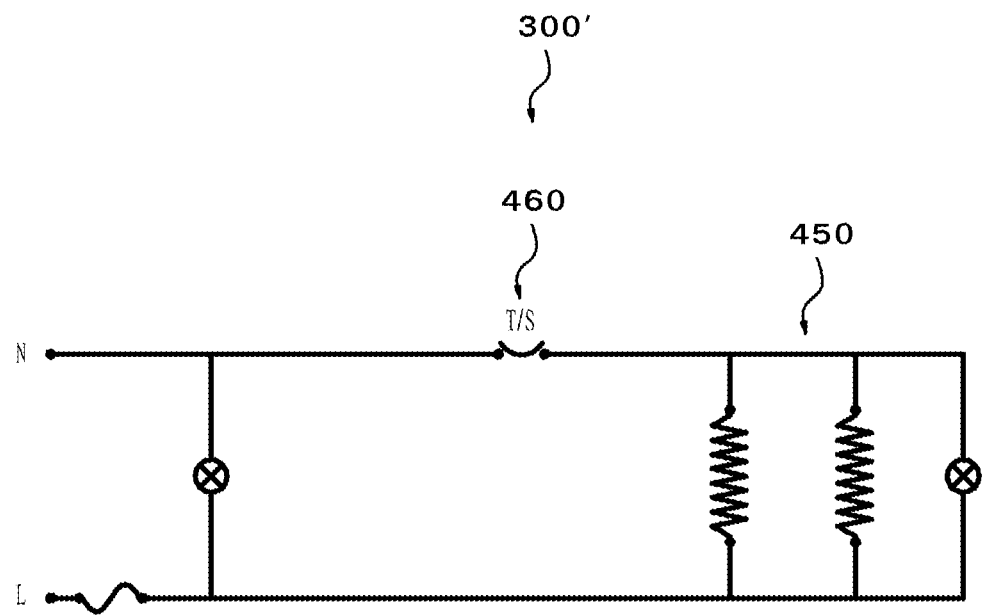
FIG. 6 illustrates the circuit of the grill in the other preferred embodiment.
Figure 7:
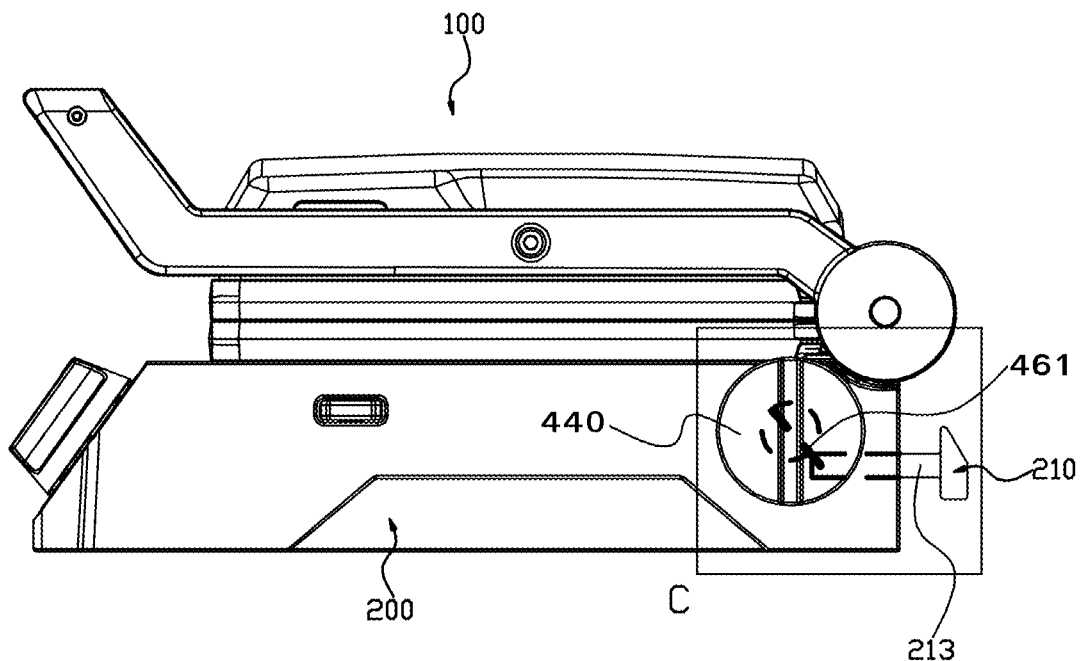
FIG. 7 illustrates the structure of the grill in a closed status in the second preferred embodiment.
Figure 8:
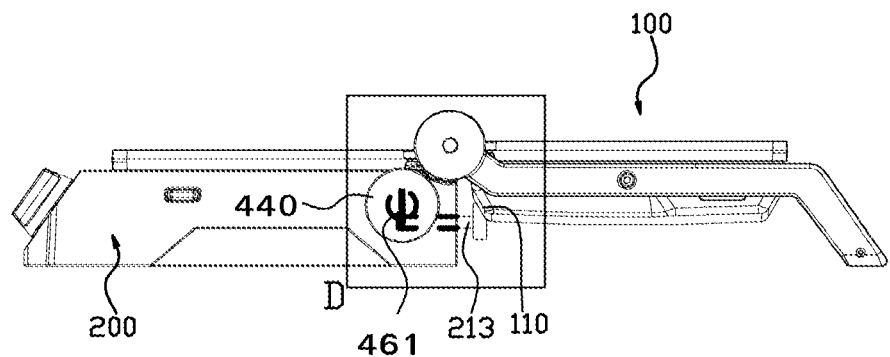
FIG. 8 illustrates the structure of the grill in an open in 180 degrees status in the second preferred embodiment.

Referring to FIG. 6, FIG. 7 and FIG. 8, a temperature auto-compensation grill includes an upper grilling unit 100, a lower grilling unit 200 and a heating circuit 300', the upper grilling unit 100 rotatingly connects to the lower grilling unit 200 and rotates between a first position and a second position. The grill is in a closed status when the upper grilling unit 100 is in the first position, and the grill is in an open 180 degrees status when the upper grilling unit is in the second position.

Referring to FIG. 7, FIG. 8, FIG. 9 and FIG. 10, the lower grilling unit 200 is disposed with an operation mechanism 210 inside. The operation mechanism 210 includes a linkage 213 slidingly connecting to the lower grilling unit 200. The first end of the linkage 213 is disposed inside the lower grilling unit 200, while the second end extends out of the rear side of the lower grilling unit 200. The rear side of the upper grilling unit 100 is disposed with a withstand portion 110, which can withstand the second end of the linkage 213 to push the linkage slidingly when the upper grilling unit rotates from the first position (closed) to the second position (open). That is the operation mechanism's linkage 213 makes contact with the upper grilling unit of the grill.

Figure 9:
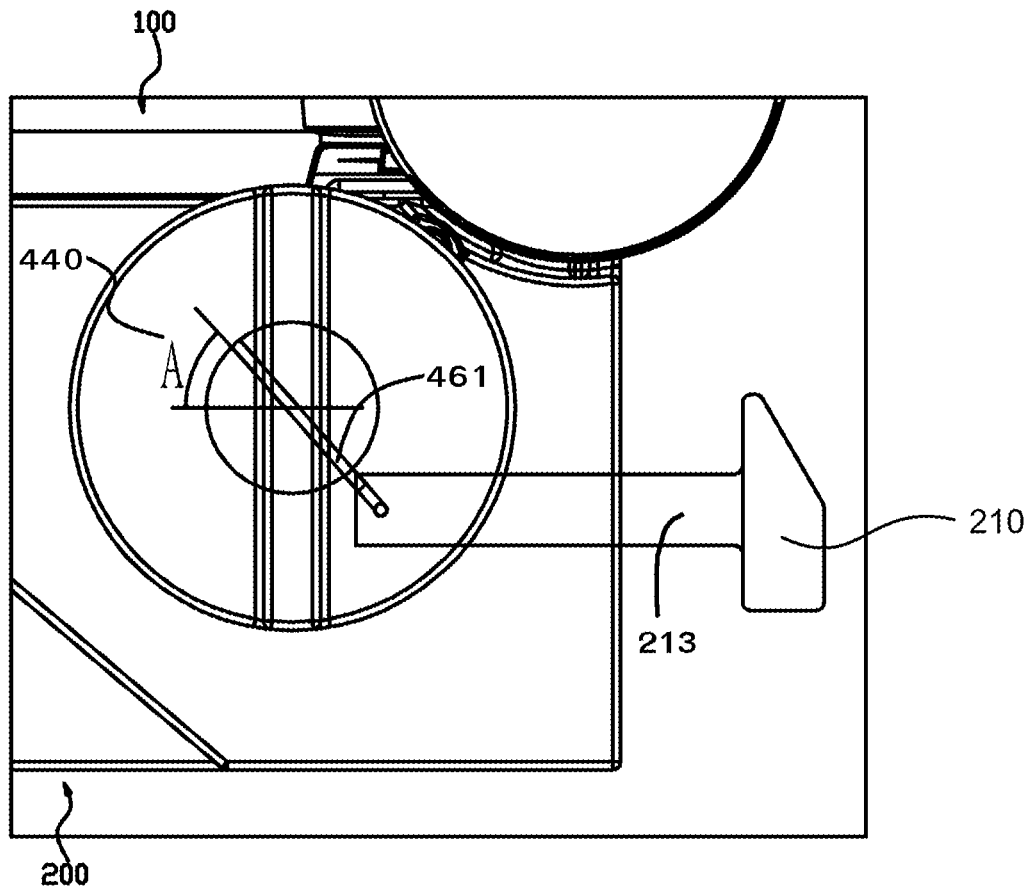
FIG. 9 illustrates the enlargement of part C of FIG. 7.
Figure 10:
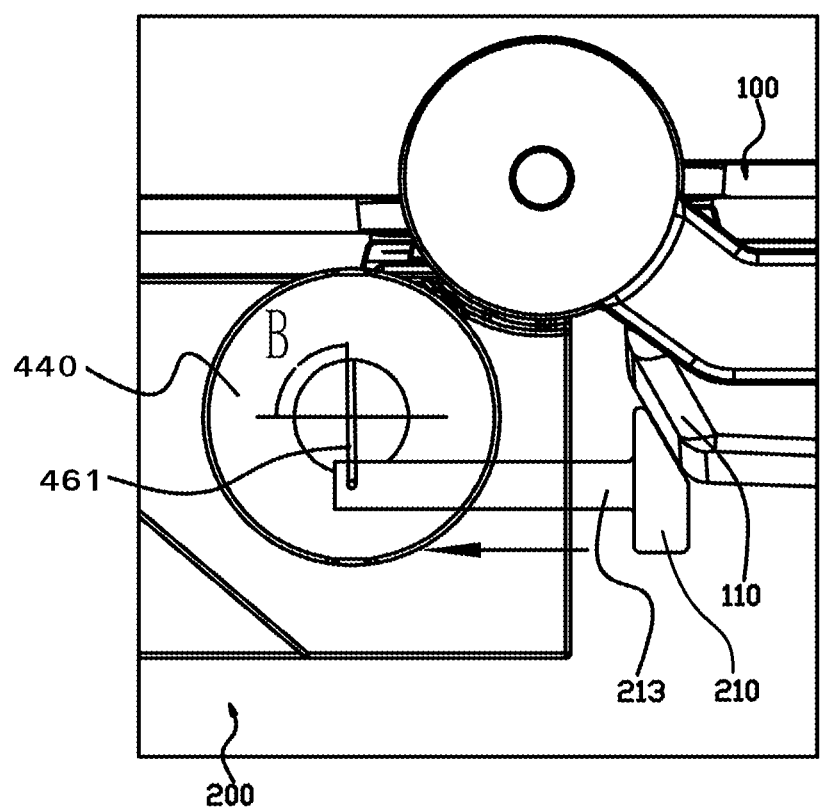
FIG. 10 illustrates the enlargement of part D of FIG. 8.

Referring to FIG. 6, FIG. 9 and FIG. 10, the heating circuit 300' includes:

A heater 450, one end of which attaches to one electrode of the power source;

A thermostat 460 to regulate the steady temperature connects to the other end of the heater and the other electrode of the power source, the thermostat 460 includes a change-over switch 440 with switch 461 to set the steady temperature of the thermostat, the thermostat has the first steady temperature in the first status, and the second steady temperature in the second status. The first end of the linkage withstands the change-over switch.

Referring to the FIG. 6, FIG. 9 and the FIG. 10, the heating circuit 300' includes a heater 450, one end of each connects to the one electrode of the power source, a thermostat 460 to regulate the temperature, one end of which connects to the other end of the heater and the other end connecting to the other electrode of the power source. The thermostat 460 to regulate the temperature has a change-over switch 440 with switch 461 to establish the first steady temperature when in the first status and the second temperature when in the second status.

The grill transforms from the closed status to the open in 180 degrees status. The upper grilling unit rotates, when the withstand portion withstands the second end of the linkage, and continues rotating until the withstand portion slidingly drives the linkage and the change-over mechanism rotating to change from the angle B to the angle A. That is the change from the first steady temperature to the second steady temperature. The grill transforms from the open in 180 degrees status to the closed status. The upper grilling unit rotates, when the withstand portion and the change-over mechanism return to the normal position, the change-over mechanism changes from the angle A to the angle B. That is the change from the second steady temperature to the first steady temperature.

In this preferred embodiment, as requirement, the heating circuit 300' is further disposed with a power light and a heater light connected in parallel to the heater, and the first steady temperature is lower than the second steady temperature.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

INDUSTRIAL APPLICABILITY

The present invention provides a temperature auto-compensation grill which can choose different thermostats when in the first status and in the second status. The present invention can regulate the temperature control system automatically, achieving temperature auto-compensation. The present invention has a good usage effect and industrial applicability.

What is claimed is:

1. A temperature auto-compensation grill, comprising:
a lower grilling unit;
an upper grilling unit rotatingly connected to the lower grilling unit and rotatable between a closed position in which the upper grilling unit and the lower grilling unit are closed with respect to one another and an open position in which the upper grilling unit and the lower grilling unit are opened with respect to one another, the upper grilling unit including a withstand portion;
a heating circuit comprised of:
    a heater having one end attached to one electrode of a power source; and
    a thermostat to regulate and provide a steady temperature having one end attached to another end of the heater and having another end attached to another electrode of the power supply, the thermostat including a change-over switch to select the steady temperature of the thermostat, and
an operating mechanism including a linkage that is slidingly connected to the lower grilling unit and that has first and second ends, the first end of the linkage making contact with the change-over switch and the second end of the linkage extending from the lower grilling unit and making contact with the withstand portion of the upper grilling unit in the open position,
wherein the withstand portion withstands contact with the second end of the linkage and slidingly pushes the linkage when the upper grilling unit rotates from the closed position to the open position, and
wherein the thermostat has a first steady temperature in the closed position, and a second steady temperature in the open position, and the first steady temperature is lower than the second steady temperature.

2. A temperature auto-compensation grill, comprising:
a lower grilling unit;
an upper grilling unit rotatingly connected to the lower grilling unit and rotatable between a closed position in which the upper grilling unit and the lower grilling unit are closed with respect to one another and an open position in which the upper grilling unit and the lower grilling unit are opened with respect to one another, the upper grilling unit including a withstand portion extending from a rear portion of the upper grilling unit;
a heating circuit comprised of:
    a heater having one end attached to one electrode of a power source; and
    a thermostat to regulate and provide a steady temperature having one end attached to another end of the heater and having another end attached to another electrode of the power supply, the thermostat including a change-over switch disposed inside the lower grilling unit to select the steady temperature of the thermostat, and
an operating mechanism including a linkage that is slidingly connected to the lower grilling unit and that has first and second ends, the first end of the linkage disposed inside of the lower grilling unit and making contact with the change-over switch and the second end of the linkage extending from a rear portion of the lower grilling unit and making contact with the withstand portion of the upper grilling unit in the open position,
wherein the withstand portion withstands contact with the second end of the linkage and slidingly pushes the linkage when the upper grilling unit rotates from the closed position to the open position, and
wherein the thermostat has a first steady temperature in the closed position, and a second steady temperature in the open position, and the first steady temperature is lower than the second steady temperature.

* * * * *